Dec. 17, 1946.   J. A. LAUCK   2,412,588
GEAR DIVIDER WITH PRESSURE LOADED BUSHINGS
Filed May 31, 1943   2 Sheets-Sheet 1
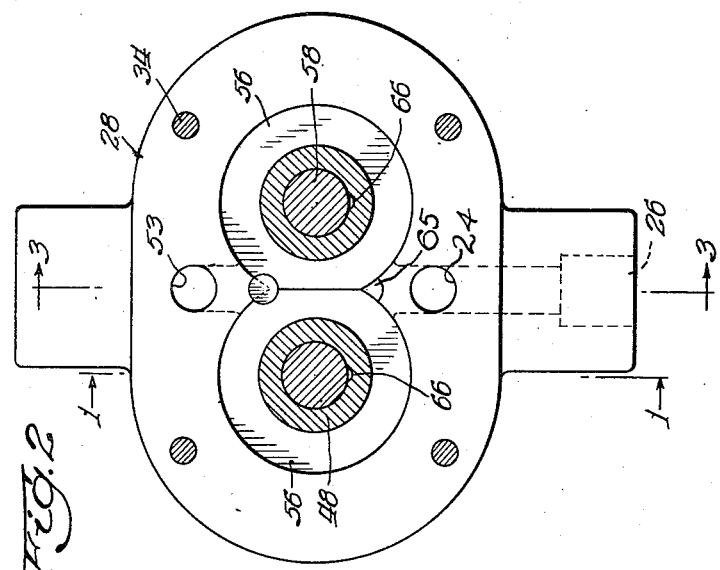
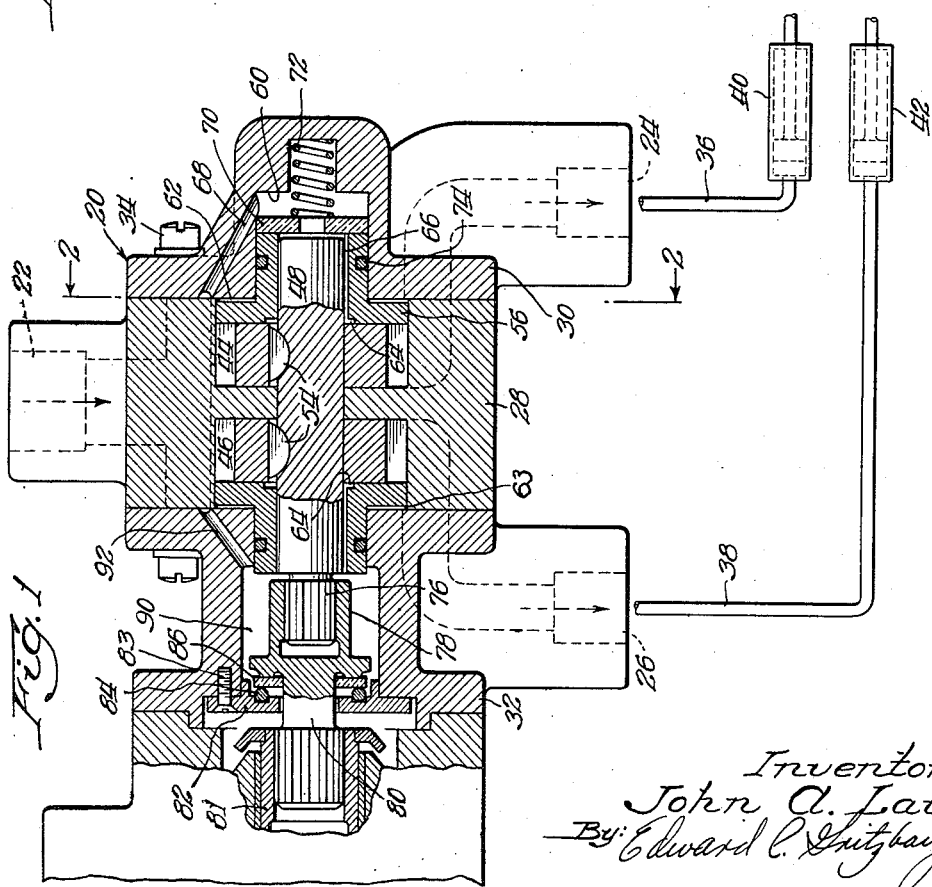
Inventor:
John A. Lauck
By: Edward C. Snitzbaugh
Atty.

Dec. 17, 1946.    J. A. LAUCK    2,412,588
GEAR DIVIDER WITH PRESSURE LOADED BUSHINGS
Filed May 31, 1943    2 Sheets-Sheet 2
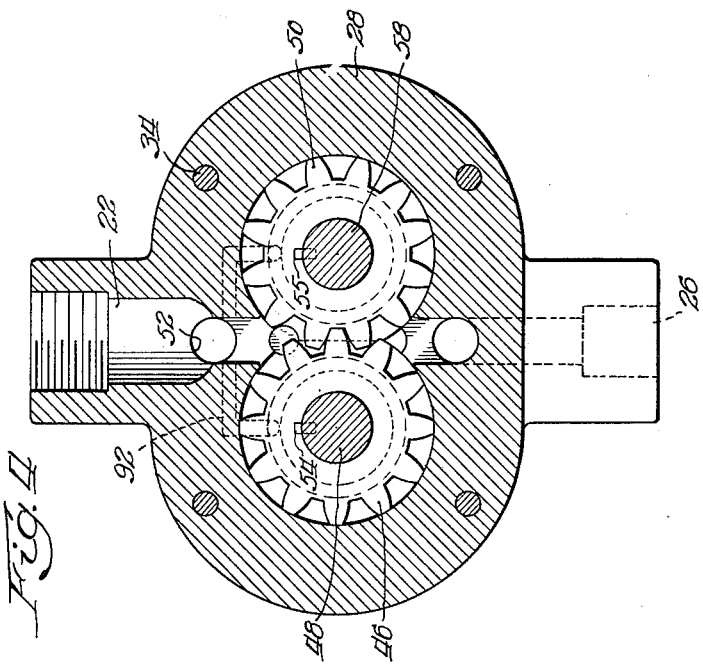
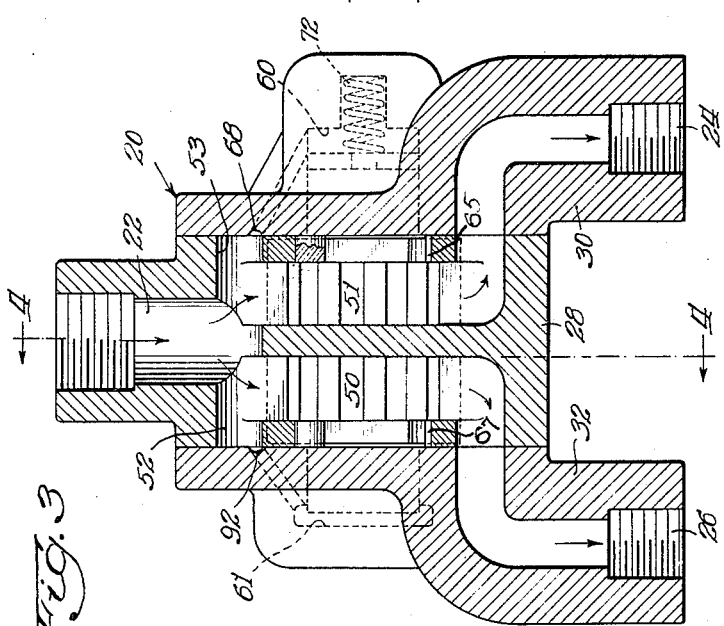
Inventor:
John A. Lauck
By: Edward C. Gatzbaugh
Atty.

Patented Dec. 17, 1946

2,412,588

UNITED STATES PATENT OFFICE 2,412,588

GEAR DIVIDER WITH PRESSURE LOADED BUSHINGS

John A. Lauck, South Euclid, Ohio, assignor to Pesco Products Co., Cleveland, Ohio, a corporation of Ohio Application May 31, 1943, Serial No. 489,145

9 Claims. (Cl. 103—126)

This invention relates to pumps and the like. It is primarily directed to the provision of a gear type pump arrangement for use as an equalizer and divider of a fluid stream, said pump having a bushing means loaded by the pressure existing at the outlet of the pump.

In this connection, it is an object to disclose an improved arrangement in which fluid from a single source may be introduced to a pumping means, divided into two streams in the pumping means, and discharged in substantially equal amounts from the pumping means, regardless of a variation in pressure at the respective discharge outlets.

It is a further object to disclose an arrangement in which two devices to be operated in synchronism, for example the wing flaps of an airplane, receive the same amount of operating fluid from a multiple outlet gear pump, regardless of a variation in operating pressure conditions between the two devices.

It has been determined that where a dual gear pump is employed which has two or more outlets and a single inlet with divider means, and in which the gears are rotated at the same rate as, for example, when the driving gears are both on the same shaft the amount of fluid pumped by each gear in ordinary operation will materially vary with the variation of pressure against which the particular gear set is working on the output side. Where it is essential that two devices subject to varying pressures receive proportionate amounts of the fluid pumped, so that they are operated in synchronism, compensating means must be provided. Heretofore, this has been accomplished for example, by the provision of throttling or compensating valves connected across the outlets on the discharge side. It is an object to disclose an improved arrangement for compensating such variation in pressure which eliminates the need for throttling valves.

It is a further object of this invention to provide a construction which is relatively light, and therefore adaptable to installation in such places as aircraft; a device which is relatively inexpensive and easily manufactured; a device which eliminates the use of comparatively expensive and tricky valve assemblies, and a device which eliminates the necessity for rubber or neoprene bushings.

It is a further object to provide a construction which produces a bushing pressure against the gear wheels substantially equal to or slightly greater than the pressure needed to load the pump and pump the fluid, and in which the pressure of the bushing and consequently the friction produced thereby on the gear wheels varies directly with the load of the device operated by the fluid. With this arrangement, when the load on one or more of the fluid outlets is eliminated or reduced, the bushing pressure on the gear wheel for that particular fluid outlet will be correspondingly eliminated or reduced. This automatically unloads the power means so that it is not pulling substantially more than necessary at any particular time.

It is an object to provide a device which is relatively simple, is extremely efficient, and one which is adaptable to a large number of uses. Further, it is an object to provide a construction which may be embodied in a single housing, and which has a compact construction.

It is a further object to disclose a multiple outlet dual gear pump having automatically compensating bushings which load or unload the pump gears of each set in accordance with the work to be done to synchronize the device to the other set.

The above and other objects, advantages and uses of my invention will become apparent from a reading of the following specification and claims taken in connection with the appended drawings which form a part of this specification and wherein:

Fig. 1 is a fragmentary axial sectional view, partially schematic, illustrating the device of the present invention, the view being taken on the line 1—1 of Fig. 2, looking in the direction of the arrows;

Fig. 2 is a view taken on the line 2—2 of Fig. 1, looking in the direction of the arrows;

Fig. 3 is a sectional view taken on the line 3—3 of Fig. 2, looking in the direction of the arrows; and Fig. 4 corresponds to Fig. 3, but is taken on the line 4—4 of Fig. 3 looking in the direction of the arrows.

Referring in more detail to the construction shown in the various figures, and referring first to Fig. 1, there is provided a housing 20, having an inlet chamber 22 and a plurality of outlets 24 and 26. The housing proper is preferably constructed in three principal parts, the parts being the center plate 28, the side plate 30, and the side plate 32. These parts are held in assembled relation by means of the machine bolts 34, or by any other convenient means, in the well-known manner.

The outlet ports 24 and 26 are respectively connected in any convenient manner (such as by the piping shown schematically at 36 and 38), to devices to be driven hydraulically, such, for example, as the fluid motors 40 and 42. The inlet 22 is connected to a source of fluid, which is preferably a low pressure source for the motor driven pump arrangement shown.

Referring to Figs. 1, 2 and 4, two sets of gear wheels are shown, constituting a dual set or pair of gear pumps, one gear pump being located on each side of the center plate 28, each gear pump being separate from the other, but the drive gears 44 and 46 (constituting the drives for the respective pumps) being located on the same shaft 48 of the device, the shaft 48 passing through the center plate 28 and having a driving connection (hereinafter described more in detail) with a source of power such as an electric motor.

Each of the drive gears 44 and 46 meshes with one of a pair of driven gears. The drive gear 46 and its driven gear 50 mesh to form one gear pump, and the drive gear 44 meshes with its driven gear 51 to form a second gear pump. As will be most clearly apparent from Fig. 3, the gear pump formed by the drive gear 46 and the driven gear 50 communicates with the inlet 22 by means of a port 52, and the gear pump formed by drive gear 44 and its driven gear 51, communicates with the inlet 22 by means of the port 53. It will thus be seen that the two gear pumps have separate means communicating to the single inlet chamber 22, whereby they are furnished with fluid from a single conduit means or source.

The drive gears 44 and 46 are splined or keyed to the shaft 48 by any convenient means, such as by means of the keys 54 (see Figs. 1 and 4). The driven gears 50 and 51 may be keyed to driven shaft 58, if desired, although it is not essential, each by means of a key or the equivalent 55 (see Fig. 4).

The outlets for the respective gear pumps preferably do not communicate with each other in any way. The gear pump characterized by the drive gear 44, communicates with the outlet 24, and the gear pump characterized by the drive gear 46 communicates with the outlet 26. (See Figs. 1 and 3 in particular.)

As is clearly indicated in Fig. 2, movable flange bushing 56 (preferably formed in two close-fitting sections for convenience in manufacture), seats against the drive gear 44 and its driven gear 51, the ends of the drive shaft 48 and the driven shaft 58 being journalled in said bushing 56, and said bushing 56 being movable axially of the said drive shaft and driven shaft to and away from the gear wheel 44 and the gear wheel 51. The position of this flange bushing 56 with respect to the gear wheels 44 and 51 determines the amount of fluid pumped by such gear wheels under normal operating conditions. The flange bushing 56 in its portions outstruck from the flange, and extending axially of and surrounding shafts 48 and 58, is received in a pair of cup-shaped chambers 60 and 61, and is adapted to move axially within limits into or out of said chambers 60 and 61, for the purposes hereinafter made clear.

There is provided more space between the gears 44 and 51 and the side plate 30 than is needed to accommodate the width of the flange of bushing 56, thus defining a slight axial clearance between the "top" portion of the flange of the bushing and the housing 20, and thus there is formed a fluid pressure channel 62 between said bushing 56 and housing 20, in which channel fluid under pressure is maintained when the bushing is forced against the gear wheel 44 and the gear wheel 51, in normal operation, said bushing being permitted to move into said space or channel 62 when the pressure is relieved at the outlet of the pump, thus unloading the pump. Channel 63 is similarly provided for gears 46 and 50. Port means 65 and 67 connect channels 62 and 63 respectively to outlets 24 and 26 by means of which fluid in said respective outlets and channels flows back and forth to maintain the same pressure in the channels as in the respective outlets.

There may be provided a low pressure annulus 64 adjacent each gear wheel on the gear side of said bushing 56, which is vented to low pressure, such as the low pressure chamber 60 for each gear wheel, by means of the vents 66, or the like. This low pressure annulus reduces the effective pressure actuated area on the gear side of the bushing 56, thus helping to hold it to less than the pressure actuated on the other side of said bushing. This annulus may be omitted by using an increased area, for example, the additional area across the end of the bushing as a supplemental pressure area, or by the use of pistons loaded by pressure and bearing against said bushing.

The low pressure area in the chamber 60 preferably communicates with the inlet side of the pump by means of a conduit 68. In this manner, fluid accumulating between the gear 44 and the bushing 56 will be conducted from the annulus 64, through the vents 66, into the space between the ends of the shaft and the bushing 56, and will be discharged through the hole in the washer 70 into the cup-shaped chamber 60, from where it will find its way back to the inlet 22 by way of the conduit 68.

A spring or the like 72, may be provided in the housing 20, exerting a pressure on the bushing 56 to urge it toward the gear wheel 44.

The ring seal 74 prevents the passage of any appreciable amount of fluid between the bushing and the wall of the housing in a manner which will be apparent from examination of Fig. 1.

The bushing 56 should be held against the gear wheel 44 and the gear wheel 51 with only a slight amount more pressure than is necessary to overcome the pressure of the fluid being pumped. The fact that the under side of the bushing, that is the side next to the gear wheel, has less area subject to the pressure than the outside of the flange, where the pressure channel 62 exists, provides the bushing with the necessary increment of pressure to hold it against the gear wheel during the normal pumping operation. The efficiency of the gear wheel is determined by the closeness of the fit of the bushing, it being understood that the bushing should not set too tightly against the wheels because it will bind the gear wheels. As the pressure in the outlet 24 rises, the pressure in the fluid pressure channel 62 will likewise rise, and the pump efficiency will increase. Therefore, if the back pressure in the outlet 24 is raised by reason of a sudden resistance acting on the fluid motor 40, the efficiency of the pump will increase to meet the resistance and the fluid motor 40 will operate as expected.

The arrangement on the opposite side of the center plate 28 is similar to that just above described, with a few minor exceptions. The bushing 61 is similar to or identical with the bushing 56, and the low pressure annulus 64 is the same. The device is likewise provided with the vent 66, as was true in the arrangement above described.

The spring 72 and the washer 70 are omitted from the construction shown in connection with the drive gear 46 on the left-hand side of the plate 28. They may be provided for the driven gear 50, although they are not essential for the pumps in the construction shown. The spring 72 may, if desired, be compensated for by a slight increase in the size of the annulus 64 or by the provision of a spring elsewhere.

The shaft 48 is provided with the knurled or splined engaging member 76, with which the flexible coupling 78 engages for driving the shaft 48. This flexible coupling 78 is preferably an integral part of a shaft 80 which extends through and is journaled in a cap member 82, the cap 82 being in turn attached to the housing 20 by means of machine bolts or the like 83. A flexible sealing ring 84 made of neoprene or the like is carried in the cap 82, and the washer-like bearing member 86 is inserted between the seal 84 and the member 78. The shaft 80 is in turn provided with means such as a knurled or splined head which engages a mating socket on a motor shaft 81, whereby the shaft 48 is driven.

A chamber 90 corresponds generally in function to the chamber 60, and a conduit 92 connects the chamber 90 to a low pressure area such as to the inlet 22 in the same manner that the conduit 68 connects the chamber 60 in said inlet.

In the operation of the device fluid from an accumulator or the like, is introduced into the inlet chamber 22, where it is divided and goes through the ports 52 and 53 to the two fluid pumps in quantities "called for" by said pumps, that is, to the pump comprising the gears 44 and 51 on the one hand and the pump comprising the gears 46 and 50 on the other. The fluid is picked up by the gear wheels and carried to the respective discharge conduits 24 and 26 as indicated. With equal operating conditions on the fluid motors 40 and 42, the flow in the conduits 24 and 26 will be identical. Should, however, the reverse pressure in one of the lines 36 or 38 be built up by reason of greater stress on the fluid motor for that line, the bushing 56 or 61 (the one for the pump operating against greatest pressures) will tighten against the gear wheels, for example, 44 and 51, (or if the pressure is built up in the line 38, the bushing 61 will tighten against the gear wheels 46 and 50), and the pressure existing in said outlet will be exerted in the annulus 62 (or 63 as the case may be). As a result, the efficiency of the particular pump will be increased and the flow of fluid will increase correspondingly, compensating for the back pressure and moving the fluid motor ahead in synchronism with the other unit, that is the motor in the other side.

Upon reduction in pressure in one line as compared to the other, the corresponding bushing will tend to move away from its gears, and the efficiency of the pump will drop instantly until the relative positions of the pistons of the motors 40 and 42 will be the same. It is understood that this action takes place almost instantly, and that the provision of a pressure unloading bushing of this kind eliminates the necessity for throttling valves or other balancing means, and also keeps the pumps operating at maximum efficiency for the amount of work necessary to operate the fluid motors.

It is thus seen that there is provided an extremely compact construction which is relatively simple, which is easy to manufacture and eliminates the necessity for throttling valves which are difficult to make and expensive.

While I have described my invention in connection with certain specific embodiments thereof, it is to be understood that this is by way of illustration and not by way of limitation and the scope of my invention is to be defined by the appended claims which should be construed as broadly as the prior art will permit.

I claim:

1. In a device of the class described, a housing having a common fluid inlet passage adapted to receive fluid from a fluid source and a plurality of separate independent outlet ports adapted to discharge fluid in separate streams having a definite volume ratio irrespective of any differences in the resistances encountered by said respective outlet streams, said housing being provided with a plurality of non-communicating chambers corresponding in number to said outlets and in common communication with said common inlet passage, each chamber being in communication with a different one of said outlet ports, rotary fluid displacement means in each of said chambers, means drivingly connecting all of said rotary fluid displacement means for simultaneous rotation; said arrangement being particularly characterized by the provision of at least one bearing and pumping seal defining unit in each chamber, each unit including an end plate portion, each of said end plate portions having a back face normally spaced from the adjacent end wall of the associated chamber and forming with said associated chamber a control pressure chamber for the action of liquid in effecting pressure engagement of said end plate portion in fluid seal relation with the corresponding rotary fluid displacement means; and means placing said respective control pressure chambers in separate communication with the outlet fluid from the corresponding rotary fluid displacement means.

2. In a device of the class described, a housing having a common fluid inlet passage adapted to receive fluid from a fluid source and a plurality of outlet ports adapted to deliver fluid to independent fluid pressure consumers, said housing being provided with a corresponding plurality of noncommmunicating fluid pressure chambers in common communication with said common inlet passage, each of said chambers being in communication with a different one of said outlet ports, said chambers being separated by a common intervening partition, rotary fluid displacement means in each of said chambers, means drivingly connecting all of said rotary fluid displacement means for simultaneous rotation, said arrangement being particularly characterized by the provision of a bearing and pumping seal defining unit in each chamber, including an end plate portion, each of said end plate portions having a back face normally spaced from the adjacent end wall of said associated chamber and forming with said associated chamber an auxiliary pressure chamber for liquid under pressure effective to maintain said end plate portion in pumping seal relation with the corresponding rotary fluid displacement means, said bearing and pumping seal units being positioned to act in the direction of said common partition, and means separately placing said respective auxiliary pressure chambers in communication with the outlet pressure from the corresponding pressure fluid displacement means.

3. In a device of the class described, a housing having a common fluid inlet passage adapted to receive fluid from a fluid source and a plurality of separate outlet ports, said housing being provided with a corresponding plurality of noncommunicating fluid chambers in common communication with said inlet passage, said chambers each being in separate communication with a different one of said outlet ports, pairs of meshing gears rotatably disposed in said respective fluid chambers, a common shaft connecting said gears for rotation in unison, coaxial bores in the end walls of said housing chambers forming reduced extensions of said housing chambers, said gear members having journals extending from the sides thereof into said reduced bores; bearing and pumping seal defining means in said housing including tubular portions surrounding at least the outside ones of said journals and received in the corresponding reduced bores, said means including in addition substantially annular portions at the inner ends of said tubular portions received in said housing chambers, said annular portions each having a front face cooperable with the adjacent side face of its associated gear member, said front face and said side face constituting a pair of adjacent faces providing an area forming a pumping seal between said respective gear members and said annular portions during pumping, said front faces being subject to the pressure in said housing chambers generated by the gear teeth, each of said annular portions also having a back face normally spaced from the adjacent radial end wall of its associated housing chamber to provide with said associated chamber an annular control pressure space at the back face of each of said annular portions, means establishing communication between said respective separate outlets and the corresponding annular control pressure spaces at the back faces of said respective annular portions, whereby to subject said back faces to the respective pressures developed in said respective outlets by said gear members and thus maintain an effective pumping seal in each gear unit irrespective of any variations in back pressure.

4. In a device of the class described, means defining a housing having a common fluid inlet passage adapted to receive fluid from an external source of fluid and a plurality of separate independent outlet ports, said housing being provided with a plurality of separate fluid pumping chambers in common communication on one side with said inlet passage and in independent communication on the other side with different ones of said outlet ports, said chambers being separated by a common intervening wall, a pair of meshing gears rotatably disposed in each of said pumping chambers, means drivingly connecting said pairs of gears for rotation in unison, motive means for driving said connecting means, coaxial bores formed in at least the remotely disposed walls of adjacent housing chambers forming reduced extensions of said housing chambers, journals extending from said gears into said reduced bores; bearing and seal defining means in said housing including tubular portions surrounding said journals and received in said reduced bores, said bearing and seal defining means including substantially annular portions at the inner terminals of said tubular portions received in said housing chambers, said annular portions each having a front face cooperable with the adjacent side face of its associated gear member, said front face and said side face constituting a pair of adjacent faces providing an area forming a pumping seal between said respective gear members and said annular portions during pumping, said front faces being subject to the pressures in the corresponding housing chamber in communication with the gear teeth, each of said annular portions also having a back face normally spaced from the adjacent outer radial end wall of its corresponding housing chamber to provide therewith an annular control pressure space at the back face of each of said annular portions, means establishing communication between said respective outlets and the corresponding annular control pressure space at the back face of said corresponding annular portions, whereby to subject said respective back faces to the pressure developed in said respective outlets by said gear members to insure a pumping seal between said gears, annular front face and intervening wall, means defining a relief recess disposed inwardly of the root of the teeth of said gear members, respectively, and communicating with the radial inner portions of the area providing said pumping seal, and means establishing communication between said relief recess and a zone under less pressure than the pressure in said outlet.

5. In an arrangement for dividing a fluid stream into a plurality of streams having a definite volume ratio and raising the pressure thereof, including means defining a housing having a common fluid inlet passage adapted to receive fluid from an external source, a plurality of separate pumping chambers in common communication on one side with said inlet passage, each of said chambers being in separate independent communication on the other side thereof with a different one of said outlet ports, a plurality of parallel gear units received in said chambers the volumetric efficiency or displacement of the respective units normally varying in accordance with the relative resistance to flow offered by the outlet streams from said separate ports; means connecting said parallel gear units in driving relation; motive means for driving said connecting means; bearing and pumping seal defining means effective to prevent said variation in volumetric efficiencies, including at least one end plate portion in each of said separate pumping chambers having a back face normally spaced from the adjacent end wall of said associated chamber forming therewith a control pressure chamber for liquid under pressure for actuating said end plate portion toward the side face of the associated gear, said end plate portions each also having a front face subject to the pressure generated by the adjacent gear teeth and cooperable with the adjacent side face of the corresponding gear to provide a pumping seal area therewith during pumping, means defining an annular pressure relieving passage in communication with the radial inner portions of said seal area, means establishing communication between said pressure relieving passages and said common inlet, and means establishing communication between said control pressure chambers at the back faces of said respective end plates and the corresponding separate outlet, the relation of the area of said back faces to said sealing areas being such that the forces acting upon said back faces of said end plate portions always slightly exceed the forces acting on said front faces of said end plate portions, whereby to maintain said pumping seal and the volumetric efficiencies of said respective units constant irrespective of variations in the resistance to flow from said respective outlet ports.

6. In a liquid pumping and fluid stream divider comprising: a housing formed with a pair of parallel pump chambers separated by a common intervening wall, a common inlet passage leading to said chambers and separate independent outlet ports leading from said respective chambers; means including a rotatable member received in each of said pump chambers for receiving liquid from said common inlet and forcing the same through the corresponding one of said outlets; an end plate in each of said pump chambers on the remote sides of said respective rotatable members, each of said end plates having a back face normally spaced from the adjacent end wall of said pump chambers and having portions cooperable with said housing to provide auxiliary pressure chambers, said end plates also having front faces subject to the pressures in said respective pump chambers developed by said rotatable members and cooperable with the adjacent side faces of said corresponding rotatable members to provide pumping seal areas therebetween, means defining an annular pressure relieving passage in communication with the radial inner portions of said sealing areas; means establishing communication between said respective pressure relieving passages and said common inlet passage; means establishing communication between said auxiliary pressure chambers at the back faces of said end plate portions and the corresponding independent outlet ports for urging said end plates inwardly in the direction of said common wall, the relation of the areas of said back faces to said seal areas being such that the forces acting upon said back faces of said end plate portions always slightly exceed the forces acting upon said front faces of said end plate portions, whereby to maintain said pumping seals without excessive friction, wear or loss of volumetric efficiency.

7. In a liquid pump and stream dividing device: means defining a housing containing a pair of parallel pumping chambers having a common inlet and separate independent outlet ports, toothed gear units in each of said chambers, means drivingly connecting said gear units; motive means for driving said connecting means; end plate bearing and seal defining means in each of said housing chambers associated with said gear units on at least the remote side faces thereof, said end plate means each including a front face cooperable with the adjacent side face of the associated gear member, said front face and said side face constituting a pair of adjacent seal providing means between said gear members and said end plate means, said front faces being subject to the pumping pressure in said chambers generated by the gear teeth, said end plate means each also having a back face normally spaced from the adjacent radial end wall of the corresponding housing chamber and having portions cooperable with said housing to provide auxiliary pressure chambers at the back of said end plate means; means establishing communication between each of said outlet ports and the respective auxiliary pressure chambers corresponding thereto, whereby to subject the back of each of said respective end plate means to the pressure of the fluid in the corresponding outlet port, a relief recess formed in one face of each of said seal providing faces, said relief recess being disposed radially inwardly of the root of the teeth of said gears, respectively, to limit the sealing area between said side faces of said gears and said front faces of said end plate means, and means establishing communication between said relief recesses and said common inlet pressure passage.

8. In a liquid pump and stream divider: means defining a housing containing two sets of pairs of parallel adjoining substantially cylindrical chambers, each of said sets of chambers having remotely spaced radial end walls and a common intervening wall, said housing having a common inlet passage communicating with all of said chambers and separate independent outlet ports leading from said respective pairs of chambers; a toothed gear member in each of said housing chambers, said gear members meshing in pairs at the juncture of said corresponding parallel cylindrical chambers; bores in the remotely spaced end walls of said chambers forming reduced extensions of said housing chambers, said gear members having journals extending from the opposite sides thereof into reduced bores, means connecting all of said gears in driving relation; motive means for driving said connecting means; seal and bearing defining bushing members in said housing on at least the remote sides of said gear members, said bushing members each including radially extending flanges disposed in said housing chambers and tubular neck portions surrounding the corresponding journals and received in said reduced bores, said flanges each having a front face cooperable with the adjacent side face of its associated gear member, said front face and said side face constituting a pair of adjacent faces which provide a pumping seal between said respective gear members and said bushing members, said front faces being subject to the pressures in said housing chambers in communication with said gear teeth, each of said flanges also having a back face normally spaced from the adjacent end wall of its associated housing chamber to provide with said associated chamber an auxiliary annular control pressure chamber at the back face of each of said flanges; means establishing communication between said respective independent outlets and the corresponding auxiliary annular control pressure chamber at the back faces of said flanges, whereby to subject said back faces to the pressure developed in said corresponding outlet ports by said gear members; means defining a relief recess in one face of each pair of said pairs of adjacent pumping seal providing faces, said relief recess being disposed inwardly of the root of the teeth of said gear members, respectively, to limit the sealing area between said side faces of said gear members and said front faces of the flanges of said bushing members; and means establishing communication between said recesses and said common inlet passage.

9. In a liquid pump and stream divider arrangement: means defining a housing containing parallel sets of adjacent substantially cylindrical intersecting pumping chambers, each set having a remotely disposed radial end wall and an intervening common separating wall, said housing also having a common fluid inlet passage leading to said respective parallel chambers and separate independent outlets leading from said chambers; a toothed gear member in each of said housing chambers, the gear members in each of said parallel sets meshing at the juncture of said cylindrical housing chambers; bores in at least the remote end walls of each of said chambers forming reduced extensions of said chambers, said gear members having journals extending therefrom into said reduced bores; seal and bearing defining bushing members in said housing on at least the remote sides of said gears, each of said bushing members including a radial flange disposed in the corresponding housing chamber and a tubular neck portion surrounding said journal and received in the corresponding reduced bore, said flanges each having an inner front face cooperable with the adjacent side face of its associated gear member to provide therewith a pumping seal between said respective gear members and said bushing members, said front faces being subject to the pressures in said corresponding gear chambers in communication with said gear teeth, each of said flanges also having a back face normally spaced from the adjacent radial end wall of the associated housing chamber to provide with said associated chamber an auxiliary annular control pressure chamber at the back face of each of said flanges; means establishing communication between said respective outlet ports and the corresponding auxiliary annular control pressure chamber at the back faces of said flanges, whereby to subject said back faces to the pressure developed in said respective outlet ports by said corresponding gear units; means defining a relief recess in said front face of the flange of each of said bushing members, said relief recess being disposed radially inwardly of the root of the teeth of said gear members, respectively, to limit the sealing area between the side faces of said gear members and said front faces of the flanges of said bushing members; and means establishing communication between said relief recess and said common inlet passage.

JOHN A. LAUCK.